(12) United States Patent
Wong et al.

(10) Patent No.: US 7,009,490 B2
(45) Date of Patent: Mar. 7, 2006

(54) EFFICIENT LOCK AND KEY SYSTEM

(75) Inventors: Alfred K Wong, Hong Kong (HK); Edward S Yang, Menlo Park, CA (US)

(73) Assignee: The University of Hong Kong, Hong Kong (HK)

(*) Notice: Subject to any disclaimer, the term of this patent is extended or adjusted under 35 U.S.C. 154(b) by 344 days.

(21) Appl. No.: 10/394,345

(22) Filed: Mar. 24, 2003

(65) Prior Publication Data
US 2004/0189440 A1 Sep. 30, 2004

(51) Int. Cl.
*G05B 19/00* (2006.01)
*H04Q 9/00* (2006.01)
*G08C 19/00* (2006.01)

(52) U.S. Cl. .............. 340/5.7; 340/825.72; 340/5.21; 340/5.22; 340/5.24; 340/5.25; 340/5.61; 340/5.65

(58) Field of Classification Search ............... 340/5.7, 340/5.72, 5.73, 825.72, 5.71, 542, 556, 5.22, 340/5.21, 5.24, 5.25, 5.65, 5.61, 5.63
See application file for complete search history.

(56) References Cited

U.S. PATENT DOCUMENTS

| | | | |
|---|---|---|---|
| 4,525,012 A | 6/1985 | Dünner | 312/222 |
| 4,712,398 A | 12/1987 | Clarkson et al. | 70/276 |
| 4,927,194 A | 5/1990 | Wagner | 292/128 |
| 5,157,375 A * | 10/1992 | Drori | 340/429 |
| 5,225,825 A * | 7/1993 | Warren | 340/5.22 |
| 5,228,730 A | 7/1993 | Gokcebay et al. | 292/144 |
| 5,245,329 A | 9/1993 | Gokcebay | 340/825.31 |
| 5,337,043 A | 8/1994 | Gokcebay | 340/825.31 |
| 5,367,295 A | 11/1994 | Gokcebay et al. | 340/825.31 |
| 5,552,777 A | 9/1996 | Gokcebay et al. | 340/825.31 |
| 5,565,857 A * | 10/1996 | Lee | 340/5.42 |
| 5,886,644 A | 3/1999 | Keskin et al. | 340/825.31 |
| 5,894,277 A | 4/1999 | Keskin et al. | 340/825.31 |
| 6,000,609 A | 12/1999 | Gokcebay et al. | 235/382 |
| 6,049,289 A * | 4/2000 | Waggamon et al. | 340/5.23 |
| 6,181,255 B1 * | 1/2001 | Crimmins et al. | 340/825.69 |
| 6,275,143 B1 * | 8/2001 | Stobbe | 340/10.34 |
| 6,359,547 B1 * | 3/2002 | Denison et al. | 340/5.73 |
| 6,374,653 B1 | 4/2002 | Gokcebay et al. | 70/278.3 |
| 6,419,288 B1 | 7/2002 | Wheatland | 292/337 |

(Continued)

OTHER PUBLICATIONS

What is Electronic Access Control? Security International Inc. < webpage www.securityinc.com/about/WI_Access-Control.cfm as of Dec. 23, 2002>.

(Continued)

*Primary Examiner*—Michael Horabik
*Assistant Examiner*—Scott Au
(74) *Attorney, Agent, or Firm*—Dickstein, Shapiro, Morin & Oshinsky, LLP.

(57) ABSTRACT

A method and system is disclosed for allowing users to consolidate a large number electronic keys (for operating mechanical locks) in electronic key assemblies. These electronic keys are easily duplicated, added to, removed, backed up, or upgraded. The electronic key assemblies are also more resistant to tampering. The lock assembly and electronic key designs taught by the invention are customizable to meet various security needs. The lock assembly includes a transmitter and a receiver operatively coupled to an electronic circuit in communication with a store for keys. The electronic circuit is also coupled to the mechanical levers for operating the lock assembly. The electronic key assembly also has its transmitter, receiver, a control circuit and a user interface for selecting a particular electronic key password.

20 Claims, 8 Drawing Sheets

U.S. PATENT DOCUMENTS

| | | | |
|---|---|---|---|
| 6,420,971 B1 * | 7/2002 | Leck et al. | 340/542 |
| 6,549,117 B1 * | 4/2003 | Kato et al. | 340/5.72 |
| 6,756,704 B1 * | 6/2004 | Milojicic et al. | 307/149 |
| 2003/0174044 A1 * | 9/2003 | Murray | 340/5.25 |

OTHER PUBLICATIONS

Mechanical Units Dominate, Electronic Models on the Rise. Global Sources Inc. Sep. 19, 2001, <webpage www.global-sources.com/MAGAZINES/SECURITY/0111/DLOCK.HTM as of Dec. 23, 2002>.

eLock Bicycle Storage Locker. Creative Pipe Inc. <webpage www.creativepipe.com/elocker_bycicle_storage_locker.htm as of Dec. 23, 2002>.

Colombo, Allan B. When Keys are Lost. Safety & Security Magazine. 2001. < webpage www.tpromo.com/ssmag/crime/saft16.htm as of Dec. 23, 2002>.

1996 Annual Report,. p. 21. <webpage www.hillenbrand.com/AR1996/page21.html as of Dec. 23, 2002>.

The Power of a System to Track Access Activity. TRACkey. <webpage www.supra-products.com as of Dec. 23, 2002>.

Bell, Stacey, Looking at Locks. Perspective, p. 12. Jul. 2002.

CyberLock: Locking in on Your Security. Videx. < document at www.videx.com as of Dec. 23, 2002>.

The Data Encryption Standard. Appendix C as of Dec. 23, 2002.

Access and Key Control. TRACcess. <document at www.supra-products.com as of Dec. 23, 2002>.

Data Guardian. < document at www.datakey.com as of Dec. 23, 2002>.

Technical Introduction to Datakey CIP an Datakey Cryptographic Smart Cards, <webpage www.datakey.com/resources/whitePapers/cis_whitepapers.html as of Dec. 23, 2002>.

Lista E-Lock—Improved Safety Thanks to an Electronic Locking System. <webpage www.lista.com/common/pr/en/21-3-2000.html as of Dec. 23, 2002>.

* cited by examiner

EFFICIENT LOCK AND KEY SYSTEM

FIELD OF THE INVENTION

This invention is in the field of security and access control. In particular, the invention has applicability to providing keys that are tampering resistant but are easy to securely duplicate and carry.

BACKGROUND OF THE INVENTION

Mechanical locks based on mechanical types of cylinders have been frequently modified by the addition of electronic security features. Locking elements controlled by electronic-means have been disclosed in combination with non-mechanical types of tumblers, such as in Clarkson et al. U.S. Pat. No. 4,712,398 with an eye to reduce the need to retrofit the traditional locks.

The use of electronic techniques for coding locks offers the possibility of a number of significant advantages as compared with the traditional mechanical bitting. Electronic coding can increase information content with attendant improvements to system capabilities such as more effective new countermeasures against "lock-picking" attempts.

A distinction may be made among purely electronic, magnetic or optical keys; mechanical keys equipped with electronic, magnetic or optical features; and mechanical keys which operate solely by mechanical bittings, whether those bittings be pin tumbler, dimples or other mechanical patterns.

A key comprised of electronic circuitry, magnetic or optical data storage for determining and granting access is an electronic key assembly. Some examples are described in U.S. Pat. No. 3,733,862 (Killmeyer), U.S. Pat. No. 4,144,523 (Kaplit), U.S. Pat. No. 4,326,124 (Faude), U.S. Pat. No. 4,562,712 (Wolter), U.S. Pat. No. 4,663,952 (Gelhard), U.S. Pat. No. 4,686,358 (Seckinger et al.), U.S. Pat. No. 5,245,329 (Gokcebay) and U.S. Pat. No. 5,140,317 (Hyatt, Jr. et al.). For unlocking a lock, using such a key, data is transferred to a reader associated with a lock, and the reader, in response to recognizing the pattern or code held by the key, activates unlocking. The key, see e.g., U.S. Pat. No. 3,797,936 (Dimitriadis), U.S. Pat. No. 4,209,782 (Donath et al.), U.S. Pat. No. 4,257,030 (Bruhin et al.), U.S. Pat. No. 4,620,088 (Flies), U.S. Pat. No. 4,659,915 (Flies) and U.S. Pat. No. 4,789,859 (Clarkson et al.), does require any mechanical cut or bitting configurations.

Mechanical keys, see, e.g., U.S. Pat. No. 480,299 (Voight), U.S. Pat. No. 550,111 (Sargent), U.S. Pat. No. 564,029 (Sargent), U.S. Pat. No. 3,208,248 (Tornoe), U.S. Pat. No. 4,723,427 (Oliver), U.S. Pat. No. 4,732,022 (Oliver) and U.S. Pat. No. 4,823,575 (Florian et al.), directly activate a mechanical device, with a pattern of mechanical bittings, by direct contact with the interpreting device, for instance, the tumblers, such as pin tumblers, lever tumblers, disk tumblers, rotary disk tumblers, slider tumblers, or combinations of several of these incorporated within the same lock, or other pattern-holding apparatus contained in the lock. Typically, access is granted based on the depth and configuration of the key cuts relative to the tumblers, and the keyholder is able to turn the key to lock and unlock the locking device. As a variation, a push or pull action may also be necessary for locking and unlocking. In some instances both mechanical and non-mechanical features of a key are used simultaneously.

Electronic locks and keys are often found in remotely operated devices such as car locks, garage openers and the like. However, each of these remotely operated locks require their own physical key, which typically may be bulkier than the mechanical keys. It is not uncommon to have several such keys, also termed remotes, in combination with mechanical keys. Misplacing or losing such a key is easy while duplicating them continues to be both difficult and expensive.

An example of an electronic lock and key system is the E-Lock™ product marketed by Lista® corporation of Switzerland. While the E-Lock system allows a single key to operate several electronic locks, the keys are designed to be copy proof. Loss or pilfering of a key is handled by reprogramming the system and using a new key corresponding to the reprogrammed setup. In addition, the electronic locks may be configured to relock themselves after a certain amount to further improve security.

Other examples of electronic lock and key systems include the DATAKEY CIP™ smart card. The smart card has the capability of generating keys or of receiving keys generated elsewhere. TRACcess® provides another system of electronic locks, which are operated with an authorized TRACkey™ and is configured to track all activity without relying upon external power or phone lines. The TRACcess® is a large entity solution to provide integrated security that is not suitable for day to day use by individual consumers.

SUMMARY OF THE INVENTION

The invention described below, inter alia, provides a system that allows users to carry a large number of passwords, operating as keys, without the cumbersome clanging keychain weighed down by keys that are easier for a forger rather than the intended possessor to duplicate. The passwords in the electronic key assemblies of the invention are easily duplicated, added to, or removed. In addition, backup versions of the passwords may be stored to guard against accidentally losing the key.

In another aspect, the electronic key assemblies are upgradeable, and do not suffer from the vulnerability of mechanical keys due to the ease of deciphering a master key that operates several mechanical locks by trial and error in relatively few steps.

In another aspect, the lock assembly and password combinations taught by the invention may be reprogrammable or, alternatively, programmed only at the manufacturing stage. These combinations avoid the need to recall a large number of key codes or the security risk associated with mechanical keys. Specifying the password at the manufacturing stage allows customization to meet various security needs as is described briefly next.

Conventional mechanical locks are opened by one or more keys that are determined in the course of manufacturing the lock. In such mechanical locks, sometimes manufactured so as to admit of a 'master key,' the use of cyptographic techniques is known to lead to a key capable of duplicating the function of even the master key, thus posing a security risk since all keys to locks admitting of the master key necessarily share many characteristics. This draw back is not universal since mechanical locks, such as 'number locks' requiring a particular number combination, allow for choosing alternative combinations. Such number locks however require memorization of many combinations.

In an illustrative embodiment of the invention, the lock assembly includes a transmitter and a receiver that are operatively coupled to an electronic circuit, which is preferably programmable, in communication with a memory or other store for identifiers and keys. The electronic circuit is also coupled to the mechanical levers that need to be moved to lock or unlock the lock assembly.

The electronic lock assembly is preferably a part of an electronic lock system comprising a lock assembly and an electronic key assembly. The electronic key assembly also has its transmitter and receiver so that it may communicate with the electronic lock assembly and other electronic key assemblies. In a preferred embodiment of the invention, a user interface is presented to the key user so that the user may select a password for a particular electronic lock assembly or duplication to another key. The key electronic control circuit coordinates the activities of the various key sub-parts. One or more passwords are stored on a typical electronic key assembly, which may operate one or more lock assemblies. Additionally, a stored password on the electronic key assembly may be used to set the password for a lock assembly using a password-setting button on the lock assembly to be set. Preferably such a button may be activated only during the manufacturing of the lock assembly or a limited number of times after the manufacturing.

Preferably the user interface has a display or a scroll button. Alternatively, one or more of a clickable button, an infrared port, or a pressure sensitive surface may be used to either input or view desired information on the user interface. Thus, a password is copied from one electronic key assembly to another electronic key assembly by activating a password duplication feature, establishing a link between the electronic key assemblies; receiving a specified password to be duplicated followed by storing the duplicate password. The password duplication feature is preferably accessed via the user interface, although automated duplication procedures may also be implemented in alternative embodiments. In such procedures, over a secure link, a particular transmission pattern may result in duplication of a password or in view of previously transacted information, receiving a transmitted password may automatically result in its duplication. Or, instead of copying a password, a property of the password is communicated and replicated in a generated password.

Additionally, a password-setting button in the lock assembly allows setting of the password during manufacturing. Preferably in response to pressing of the password-setting button a random sequence is stored as a password for unlocking the lock assembly. This random sequence is also transmitted to the electronic key assembly for storage as the password for unlocking the lock assembly. A password setting function is activated in the key to enable receiving the random sequence as the password for the lock assembly. In an aspect designed to improve security the password-setting button is inactivated after setting the password of the lock assembly during manufacturing.

It should be noted that the lock assembly may correspond to more than one password for unlocking the lock assembly. Indeed, a particular password may unlock more than one lock assembly. However, in contrast to the typical lock and key systems with master keys, the various passwords need not be related since they can be chosen independently. Thus, several passwords for unlocking a lock assembly may be stored on a single key, or the key may store passwords for unlocking more than one lock assembly.

Although there is no limit on the number of passwords that may be stored on a key except that imposed by the available memory, it is preferred that several passwords be stored on a single key. For instance, an electronic key assembly may store at least five passwords, at least ten passwords, at least twenty passwords, at least fifty passwords, and at least one hundred passwords. With a large number of passwords, their relative organization is preferably implemented with the passwords organized with the help of navigable folders. Preferably, the password corresponding to the lock assembly is transmitted from a key in response to a selection made via the user interface.

In response to receiving a password the control circuit in a lock assembly determines if there is a match. The match may be a common hash value, which in combination with a public-private key setup provides secure communications. Alternatively, directed communication between keys and a key and a lock assembly may reduce the likelihood of eavesdropping. To this end there is considerable flexibility since either or both of the lock assembly transmitter and the key transmitter may be coupled to one or more of an antenna and a light emitting diode and the like with corresponding receivers.

In another aspect, the lock assembly electronic control circuit is configured, at a time point following unlocking, to instruct the lock assembly mechanical parts to relock in a default mode.

The invention also encompasses designing an electronic lock assembly system. Typically, a method for designing such an electronic lock system include providing a lock assembly transmitter and a lock assembly receiver; storage for one or more passwords; and a control circuit coupled to mechanical parts for locking and unlocking the electronic lock assembly. The control circuit unlocks the electronic lock assembly in response to receiving a password matching the stored password.

The electronic key assembly has a key transmitter and a key receiver as well as password storage locations. A control circuit determines whether to transmit a password, its required encryption, implementation of various functions, and the like. The control circuit also interacts with a user via a user interface, for instance to provide functionality such as that for password duplication function for transmitting a password from one electronic key assembly to another electronic key assembly followed by storing of the transmitted password.

In another aspect, the electronic lock preferably has a password-setting button. In response to activating the button, a password is stored by the electronic lock assembly such that receiving the password operates the lock assembly. Preferably, the button is operated during the manufacturing of the lock assembly and the stored password is transmitted to an electronic key assembly for operating the lock assembly. In another aspect, the electronic key assembly has a password-setting function so that the password received from the electronic lock assembly is stored on the electronic key assembly.

In another aspect, preferably the transmissions between electronic key assemblies or with the electronic lock assembly are encrypted. An exemplary method uses a private-public key system to encrypt messages, including passwords sent to each device. By the optional use of digital signatures in some embodiments of the invention, secure communication channels may be established for transmission of the password and related information using hashing. It should be noted that such use of public-private keys is not required for practicing the invention, and any encryption scheme may be deployed to meet the particular security needs. In some embodiments, no encryption may be employed. In addition, directed communication using narrow beams, key cards, and the like may be employed with or without encryption technology.

DETAILED DESCRIPTION OF THE FIGURES

DETAILED DESCRIPTION OF THE INVENTION

The invention encompasses embodiments that allow users to carry a large number of keys, actually passwords to electronic locks, without the cumbersome clanging keychain weighed down by mechanical keys. Moreover, the passwords are easily and securely duplicated, added to, or removed using friendly user interfaces. In addition, backup versions of the passwords can be stored to guard against accidentally losing a password.

In another aspect, the electronic key assembly is upgradeable, and do not suffer from the vulnerability of mechanical keys due to easy deciphering of a master key that operates several locks by trial and error in relatively few steps.

In another aspect, the lock assembly and key combinations taught by the invention may be reprogrammable or, alternatively, programmed only at the manufacturing stage. These combinations avoid the need to recall a large number of key codes or the risk of reverse engineering of mechanical keys including master keys. Optional, fixing of the key at the manufacturing stage allows customization for particular applications. Conventional mechanical locks are opened by one or more keys that are determined in the course of manufacturing the lock. In such mechanical locks, sometimes manufactured so as to admit of a 'master key,' the use of cryptographic techniques is known to lead to a key capable of duplicating the function of even the master key, thus posing a security risk since all keys to locks admitting of the master key necessarily share many characteristics. This draw back is not universal since mechanical locks, such as 'number locks' requiring a particular number combination, allow for choosing alternative combinations, but with the drawback of remembering particular combinations. Electronic locks, however, often are reprogrammable, although this could be a security risk if the lock could be compromised by merely reprogramming it.

Figure 1:
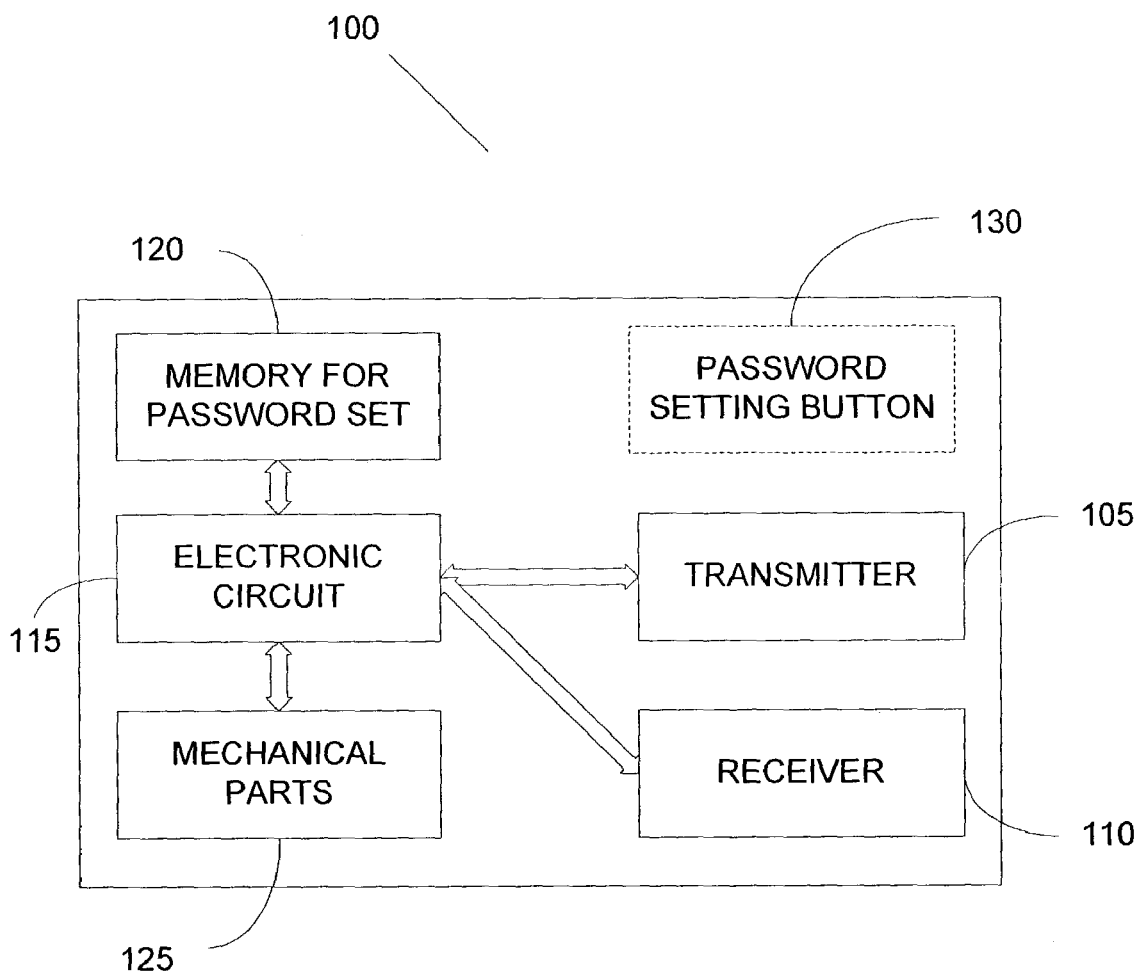
FIG. 1 is a schematic diagram illustrating an electronic lock assembly according to the invention.

In an illustrative embodiment of the invention in FIG. 1, the lock assembly 100 includes transmitter 105 and receiver 110 that are operatively coupled to electronic circuit 115, which is preferably programmable, in communication with a memory 120 or other store for identifiers and keys. The electronic circuit is also coupled to mechanical levers 125 that are operated to lock or unlock the lock assembly 100.

Figure 2:
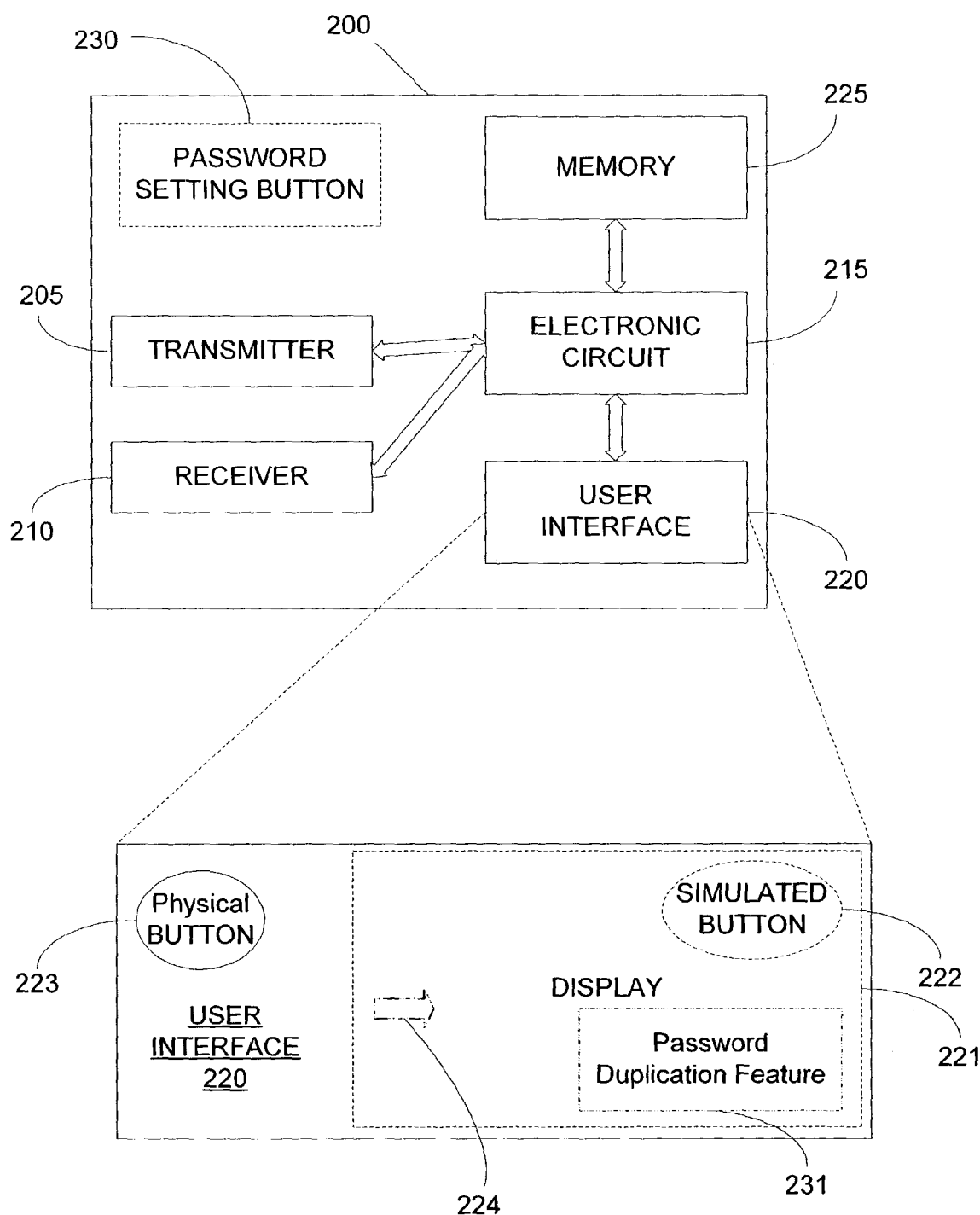
FIG. 2 is a block diagram of an electronic key assembly according to the invention.

Electronic lock assembly 100 is preferably a part of an electronic lock system comprising lock assembly 100 and electronic key assembly 200, illustrated in FIG. 2. Electronic key assembly 200 also has its transmitter 205 and receiver 210 so that it may communicate with electronic lock assembly 100 and other electronic key assemblies. In a preferred embodiment of the invention, user interface 220 is presented to the key user so that the user may select a password for a particular electronic lock or duplication to another key. Key electronic control circuit 215 coordinates the activities of the various key sub-parts. On electronic key assembly 200 one or more passwords are stored in a memory 225, which may operate one or more locks. Additionally, a stored password on electronic key assembly 200 may be used to set the password for a lock using optional password-setting button 230. Similarly, optional password-setting button 130 on the lock assembly allows setting of the password for a particular lock assembly. Preferably password-setting button 230 may be activated only during the manufacturing of the lock assembly or a limited number of times after the manufacturing.

Preferably user interface 220 has display 221 and is operated with the aid of one or more buttons, such as a physical scroll button 222 or a clickable displayed simulated button 223, which may be operated with a pointing device 224 or other means. In addition, one or more of a clickable button, an infrared port, or a pressure sensitive surface may be used to either input or view desired information on user interface 220.

Figure 3:
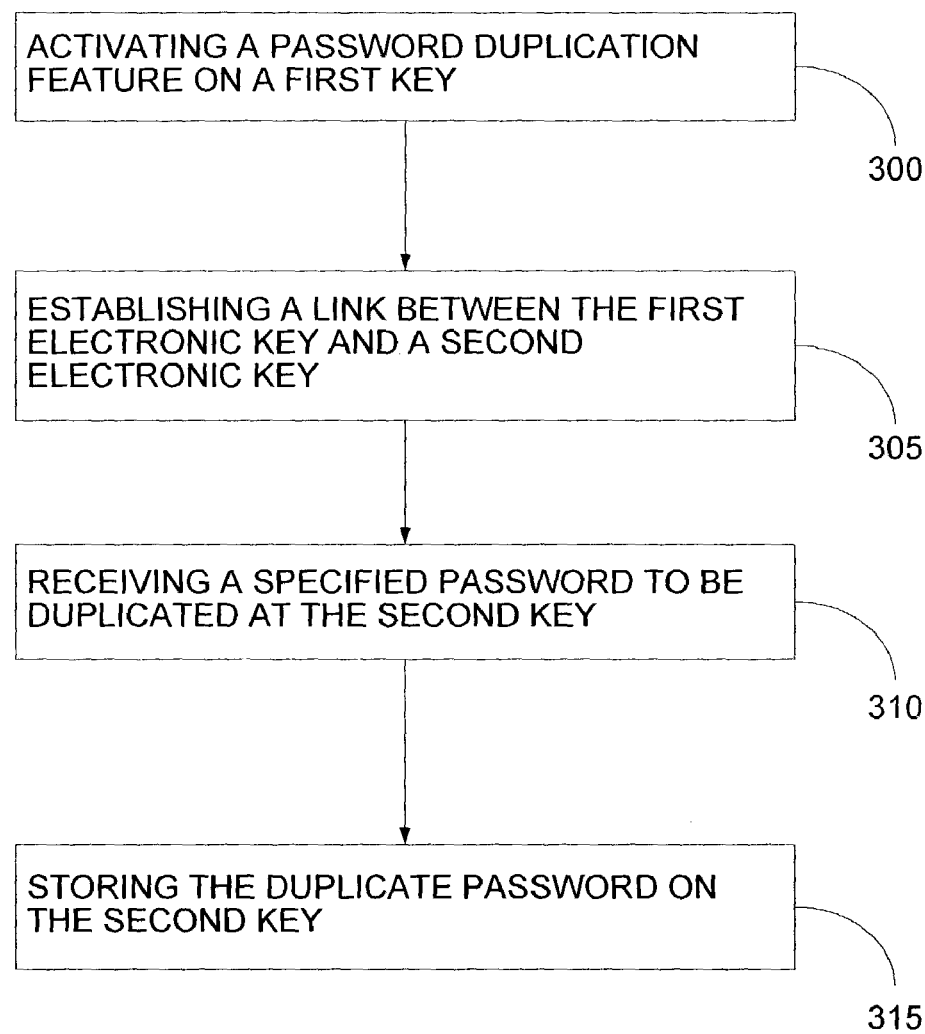
FIG. 3 illustrates a method for duplicating a password using the electronic key assemblies according to the invention
Figure 4:
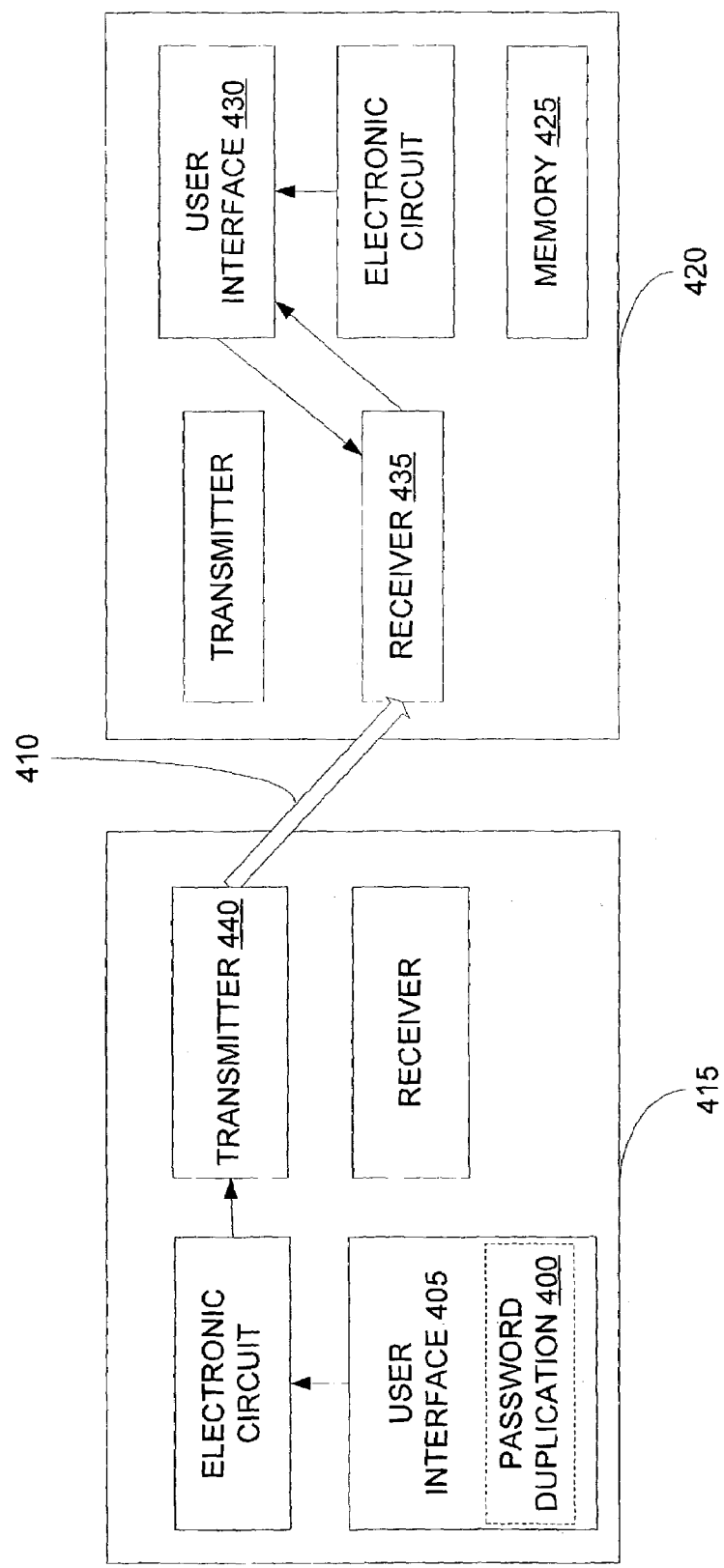
FIG. 4 illustrates interactions between two electronic key assemblies during password duplication.

A password is copied from one electronic key assembly to another electronic key assembly, as illustrated in FIGS. 3 and 4, by activating password duplication feature 400 on user interface 405 during step 300, establishing link 410 between electronic key assemblies 415 and 420 during step 305; receiving, via receiver 435 from transmitter 440, a specified password to be duplicated at electronic key assembly 420 during step 310; followed by storing the duplicate password on electronic key assembly 420 during step 315. The password duplication feature is preferably accessed via user interfaces 405 and 430, although automated duplication procedures may also be implemented in alternative embodiments. In such procedures the user need not expressly select the key duplication feature for a specific key and instead all of the passwords in a particular group of passwords on an electronic key assembly may be copied to another electronic key assembly. Or, instead of copying a password itself, a property of the password is communicated and replicated in a generated password. Examples include algorithms for generating passwords using one or more seeds or parameters, which may be replicated by copying the parameters rather than a particular password.

Additionally, as mentioned previously, password-setting button 130 in lock assembly 100 allows setting of the password during manufacturing. Preferably in response to pressing of password-setting button 130 a random sequence is stored as a password for unlocking lock assembly 100. This random sequence is also transmitted to an electronic key assembly for storage. Password setting function 230 is activated in key 200 to enable receiving and storing the random sequence as the password for lock assembly 100. In an aspect designed to improve security password-setting button 130 is inactivated after setting the password of lock assembly 100 during manufacturing.

Figure 5:
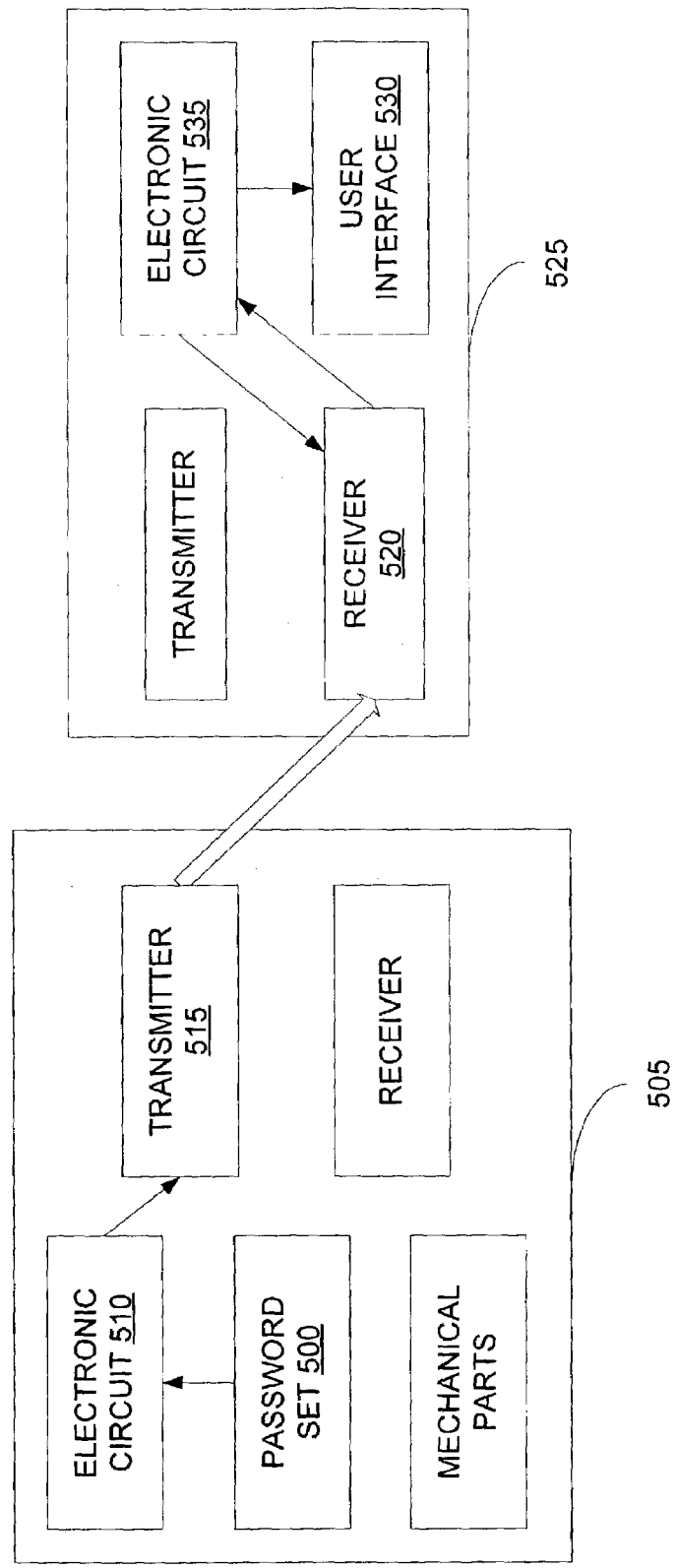
FIG. 5 illustrates interactions between a lock assembly and a key assembly while setting a password.

FIG. 5 illustrates these interactions in additional detail. Password set button 500 of lock assembly 505 is activated resulting in electronic circuit 510 activating transmitter 515 to transmit a selected key sequence to receiver 520 of electronic key assembly 525. Receiver 520 communicates with user interface 530, possibly via electronic circuit 535, to complete the process of password acceptance and storage on electronic key assembly 525.

It should be noted that lock assembly 100 may correspond to more than one password for operating lock assembly 100. Indeed, a particular password may unlock more than one lock. However, in contrast to typical lock and key systems with master keys, the various passwords need not be related, thus providing additional security compared to mechanical lock systems. This follows from the unrestricted choice available for selecting one or more passwords. Thus, several passwords for unlocking lock assembly 100 may be stored on a single key, or multiple keys, or a particular key may store passwords for unlocking more than one lock.

Figure 6:
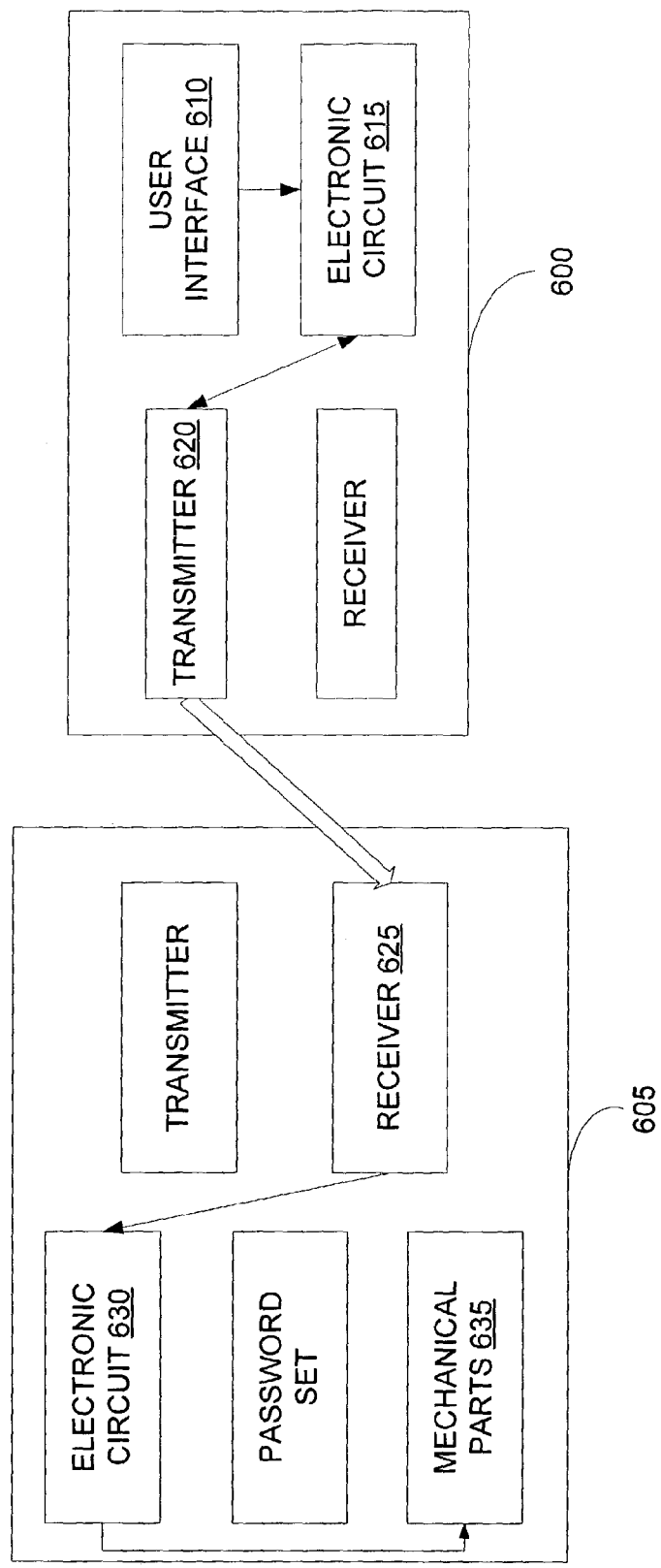
FIG. 6 illustrates interactions between a lock assembly and a key assembly for mechanically operating the lock assembly.

FIG. 6 illustrates typical unlocking interactions between electronic key assembly 600 and electronic lock assembly 605. User interface 610 receives instructions to unlock lock assembly 605 resulting electronic circuit 615 activating transmitter 620 of electronic key assembly 600 to send unlocking information to lock assembly 605 via receiver 625, which is interpreted and/or processed by electronic circuit 630 resulting in operating mechanical parts 635 for unlocking or locking lock assembly 605.

Although there is no limit on the number of passwords that may be stored on a key, it is preferred that several passwords be stored on a single key. For instance, an electronic key assembly may store at least five passwords, preferably at least ten passwords, more preferably at least twenty passwords, even more preferably at least fifty passwords, and most preferably at least one hundred passwords. With a large number of passwords, their relative organization is preferably implemented with the passwords organized with the help of navigable folders accessible via the user interface corresponding to a key. Preferably, the password corresponding to the lock is transmitted from a key in response to a selection made via the user interface.

Figure 7:
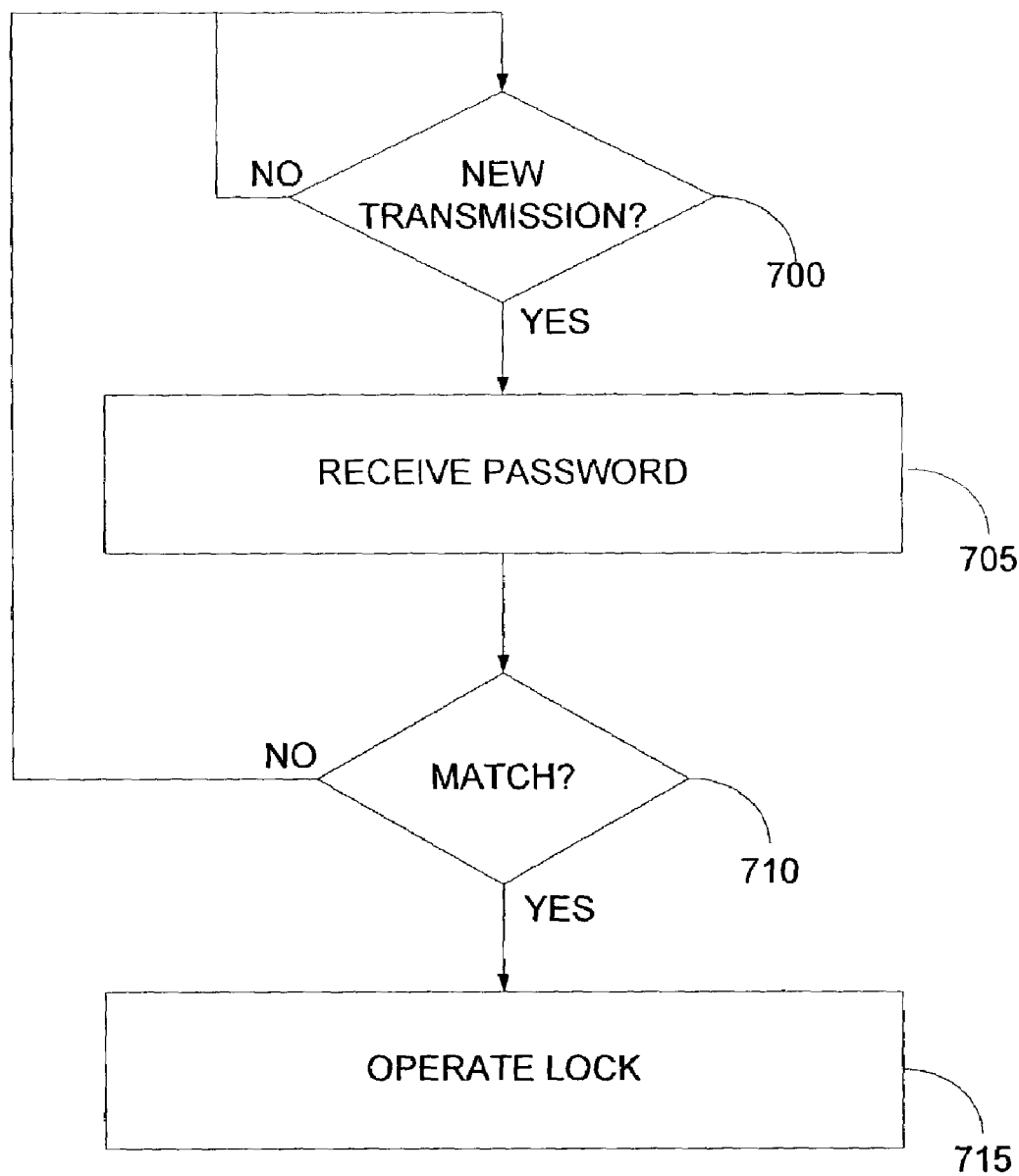
FIG. 7 illustrates a method for operation of a lock assembly in response to a key assembly.

As illustrated in FIG. 7, during step 700 a determination is made if a signal has been received. In response to receiving a signal control passes to step 705 for receiving a password. The control circuit in a lock assembly determines if there is a match between a password required by the lock assembly and the received password during step 710. The match may be a common hash value and a public-private key setup to provide for secure communications. Alternatively, directed communication between keys and a key and a lock assembly may reduce the likelihood of eavesdropping. To this end there is considerable flexibility since either or both of the lock assembly transmitter and the key transmitter is coupled to one or more of an antenna and a light emitting diode and the like with corresponding receivers.

If there is a match, then, during step 715 the mechanical parts of the electronic lock assembly are operated to unlock or lock it. On the other hand, if there is no match then control passes to step 700.

Figure 8:
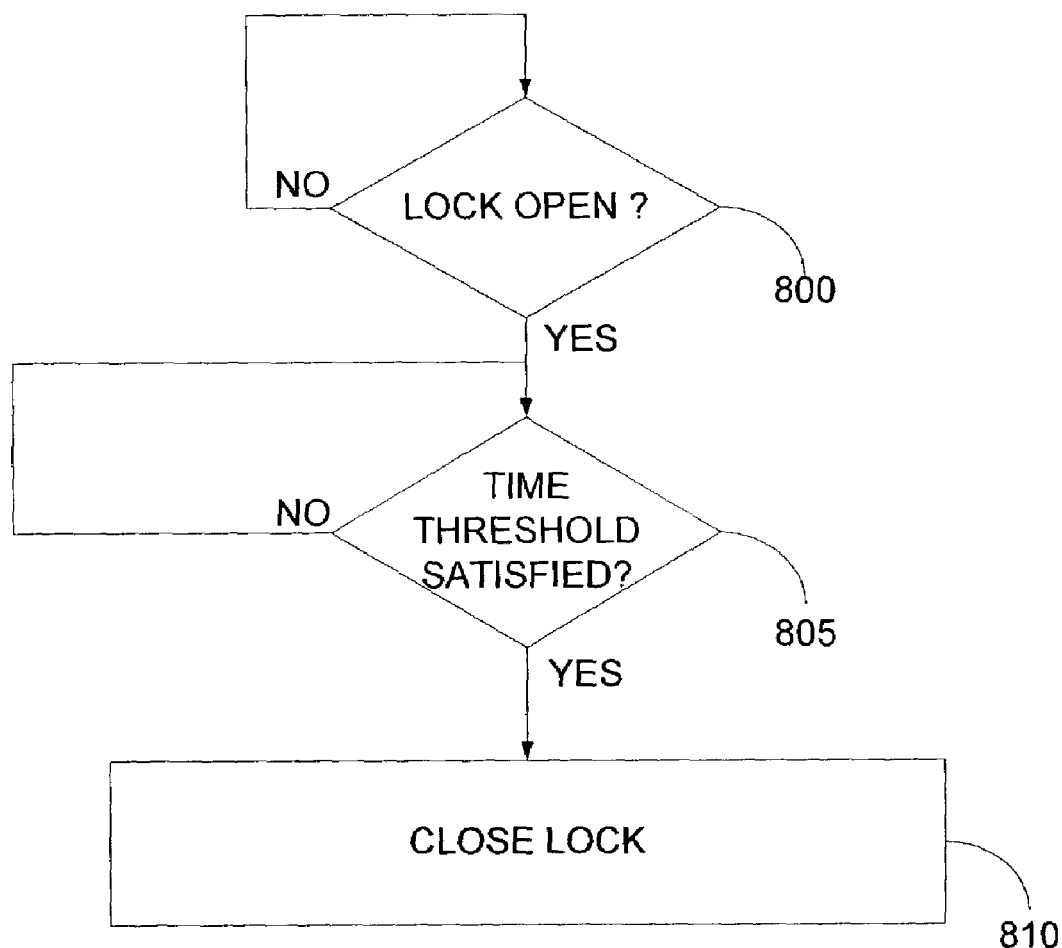
FIG. 8 illustrates a method for operation of a lock assembly to revert to a default state, for instance staying locked, in the absence of alternative instructions.

In another aspect, the lock assembly electronic control circuit is configured to, at a time point following unlocking, instruct the lock assembly mechanical parts to relock in a default mode. As shown in FIG. 8, during step 800 a determination is made as to whether the electronic lock assembly is open. In effect, in response to the electronic lock assembly being open, an estimate of the time period for which the electronic lock assembly has been open is made. If a time threshold is satisfied during step 805 then control passes to step 810 for locking the electronic lock assembly. Otherwise, control stays at step 805.

The invention also includes illustrative examples for designing an electronic lock assembly system. Typically, a method for designing such an electronic lock assembly system include providing a lock assembly transmitter and a lock assembly receiver; storage for one or more passwords; and a control circuit coupled to mechanical parts for locking and unlocking the electronic lock assembly. The control circuit unlocks the electronic lock assembly in response to receiving a password matching the stored password.

The electronic key assembly has a key transmitter and a key receiver as well as password storage locations. A control circuit may determine whether to transmit a password, its required encryption, implementation of various functions, and the like. The control circuit also interacts with a user via a user interface, for instance to provide functionality such as that for password duplication function for transmitting a password from one electronic key assembly to another electronic key assembly followed by storing of the transmitted password.

In another aspect, the electronic lock assembly preferably has a password-setting button. In response to activating the button, a password is stored by the electronic lock assembly such that receiving the password operates the lock assembly. Preferably, the button is operated during the manufacturing of the lock assembly and the stored password is transmitted to an electronic key assembly for operating the lock assembly. In another aspect, the electronic key assembly has a password-setting function so that the password received from the electronic lock assembly is stored on the electronic key assembly.

In another aspect, preferably the transmissions between electronic key assemblies or with the electronic lock are encrypted. An exemplary method may use a public key with the private key held on each device. By the optional use of digital signatures in some embodiments of the invention, secure communication channels may be established for transmission of the password and related information. It should be noted that the use of public-private keys is not required for practicing the invention, and any encryption scheme may be deployed to meet the particular security needs. In some embodiments, no encryption may be employed, or directed communication using narrow beams, key cards, and the like, may be used for additional security.

Those of ordinary skill in the art will understand that other system architectures can be used to implement the methods of the present invention described above. While the discussion herein focuses on electronic key assemblies and electronic lock assemblies, those of ordinary skill in the art will recognize that the scope of the discussion is not so limited but applies equally to designing security systems and user friendly security devices. Although an illustrative embodiment of the invention has been described herein, various modifications may be made without departing from the spirit and scope of the invention described by the following claims.

What is claimed is:

1. An electronic lock system comprising:
   at least one lock assembly having a lock assembly transmitter, a lock assembly receiver, a lock assembly password setting button, and a lock assembly electronic control circuit operatively coupled to lock assembly mechanical parts for locking and unlocking; and
   a first electronic key assembly having a key transmitter and a key receiver; a user interface presented to the key user; and a key electronic control circuit for coordinating the activities of the various key sub-parts;

wherein responsive to pressing of the lock assembly password setting button, a password is stored in the lock assembly electronic control circuit, the lock assembly transmitter transmits the password to the first electronic key assembly to be stored in the key electronic control circuit; and wherein one or more passwords are stored on the electronic key assembly to operate the at least one lock assembly.

2. The electronic lock system of claim 1, wherein the user interface has a display and one or more of a scroll button, clickable button, infrared port, or pressure sensitive surface.

3. The electronic lock system of claim 1 wherein responsive to pressing of the password-setting button a random sequence is stored as a password for unlocking the lock assembly; and the random sequence is also received by the key receiver of the first electronic key assembly to be stored in the key electronic control circuit.

4. The electronic lock system of claim 3, wherein a password setting function is activated in the first key, whereby the random sequence is received as the password for the lock assembly.

5. The electronic lock system of claim 3 wherein the lock assembly corresponds to a plurality of passwords for unlocking the lock assembly.

6. The electronic lock system of claim 5 wherein the plurality of passwords for unlocking the lock assembly are stored on the first key.

7. The electronic lock system of claim 6 wherein the first key also stores at least one password for unlocking at least one additional lock.

8. The electronic lock system of claim 6 wherein a number of passwords stored on the first key belongs to the set consisting of at least five passwords, at least ten passwords, at least twenty passwords, at least fifty passwords, and at least one hundred passwords.

9. The electronic lock system of claim 5 wherein at least one password for unlocking the lock assembly is stored on a second key assembly.

10. The electronic lock system of claim 1, wherein the password-setting button is inactivated after setting the password of the lock during manufacturing and remains inactive during the use of the electronic lock system to prevent further change of the password.

11. The electronic lock system of claim 1 wherein in response to receiving a password corresponding to the lock assembly, the lock assembly unlocks.

12. The electronic lock system of claim 1 wherein the password corresponding to the lock assembly is transmitted from the first key in response to a selection made via the user interface.

13. The electronic lock system of claim 1 wherein the lock assembly electronic control circuit is configured to, at a time point following unlocking, instruct the lock assembly mechanical parts to relock in a default mode.

14. The electronic lock system of claim 1 wherein at least one of the lock assembly transmitter and the key transmitter is coupled to one or more of an antenna and a light emitting diode.

15. An electronic lock system comprising:
at least one lock assembly having one or more lock assembly mechanical parts and a lock assembly electronic control circuit operatively coupled to the lock assembly mechanical parts for locking and unlocking; and a first electronic key assembly having a key transmitter, a user interface presented to the key user; and a key electronic control circuit for coordinating the activities of the various key sub-parts;

wherein one or more passwords are stored on the electronic key assembly to operate the at least one lock assembly; and wherein a password is copied from the first electronic key assembly to a second electronic key assembly by activating a password duplication feature in at least one of the first and second electronic key assemblies; establishing a link between the first and second electronic key assemblies; receiving a specified password at the second electronic key assembly; and finishing the duplication process by storing a new password in the second electronic key assembly.

16. The electronic lock system of claim 15, wherein the password duplication feature is accessed via the user interface.

17. A method for designing an electronic lock system, the method comprising the steps of:

providing a lock assembly transmitter and a lock assembly receiver in an electronic lock assembly having at least one stored password and a control circuit coupled to mechanical parts for locking and unlocking the electronic lock assembly, wherein the control circuit unlocks the electronic lock assembly in response to receiving a password matching the stored password;

providing a key transmitter and a key receiver in a first electronic key assembly having at least one password storage location and a control circuit coupled to various key sub-parts;

providing a user interface for the first electronic key assembly, whereby a user selects at least one password stored on the first electronic key assembly to unlock the electronic lock assembly; and implementing a password duplication function for transmitting a password from the first electronic key assembly to a second electronic key assembly followed by storing of the transmitted password on the second electronic key assembly.

18. The method of claim 17 further comprising providing a password-setting button in the electronic lock assembly, whereby a password is stored by the electronic lock assembly in response to operation of the password-setting button during the manufacturing of the lock assembly and the stored password is transmitted to the first electronic key assembly.

19. The method of claim 18 further comprising providing a password-setting function in the first electronic key assembly, whereby the password received from the electronic lock assembly is stored on the first electronic key assembly.

20. The method of claim 17, wherein at least one transmission between the first electronic key assembly and one or more of the electronic lock assembly and the second electronic key assembly is encrypted using a public key.

* * * * *